United States Patent
Huomo et al.

(10) Patent No.: US 8,176,064 B2
(45) Date of Patent: May 8, 2012

(54) METHOD, DEVICE AND SYSTEM FOR INFORMATION BASED AUTOMATED SELECTIVE DATA HANDLING AND PROVISION BY IDENTIFICATION MEANS

(75) Inventors: Heikki Huomo, Oulu (FI); Carmen Kuhl, Espoo (FI); Panu S. Markkanen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/592,875

(22) PCT Filed: Mar. 25, 2004

(86) PCT No.: PCT/IB2004/000892
§ 371 (c)(1),
(2), (4) Date: Jun. 11, 2007

(87) PCT Pub. No.: WO2005/093667
PCT Pub. Date: Oct. 6, 2005

(65) Prior Publication Data
US 2007/0299868 A1   Dec. 27, 2007

(51) Int. Cl.
*G06F 17/30* (2006.01)

(52) U.S. Cl. ..... 707/758; 707/736; 707/781; 455/414.2; 340/10.1; 340/10.3; 340/9.11; 235/375; 713/185

(58) Field of Classification Search .............. 707/104.1, 707/999.001, 736, 758, 781; 340/10.1, 10.3, 340/9.11; 455/414.2; 235/375; 717/185
See application file for complete search history.

(56) References Cited

U.S. PATENT DOCUMENTS 6,112,152 A * 8/2000 Tuttle .............................. 701/115
6,175,922 B1 * 1/2001 Wang ............................. 713/182
(Continued)

FOREIGN PATENT DOCUMENTS

EP    1069539 A2    1/2001
(Continued)

OTHER PUBLICATIONS

Ken Nakanishi et al.; "LEXP: Preserving User Privacy and Certifying the Location Information";2003 Citeseer; http://citeseerx.ist.psu.edu/viewdoc/download?doi=10.1.1.117.7074&rep=rep1&type=pdf.*

(Continued)

Primary Examiner — Dennis Truong
(74) Attorney, Agent, or Firm — Hollingsworth & Funk, LLC

(57) ABSTRACT

In general, the present invention purposes a method for automated information based selective data provision by an identification device is provided. Information data associated with a plurality of data records stored in a data storage are scanned in order to obtain filter information relating to the plurality of data records from the informational data. Then at least one data record out of the plurality of data records is selected. The selection of the data records is obtained on the basis of the obtained filter information which are compared with a predefined filter rule for identifying relevant data records which match with the filter rule. The at least one selected data record is subsequently configured at the identification device and the identification device provides at least one configured data record as an identification information to be retrievable wirelessly by an external inquiring entity. Further general aspects of the present invention relate to a method for automated information based selective data maintenance and a method for obtaining a data record applicable for information based selective data provision by an identification device. Additionally, devices, means and systems are defined which enable the performing of the purposed methods.

27 Claims, 6 Drawing Sheets

User Interface (UI) / Terminal Side a) *Append Access* (New Record)

b) *Read Access* (Readable Info)

c) *Delete Access* (Complete Record)

| Record Entry 1 |
| Record Entry 2 |
| Record Entry 3 |
| ⋮ |
| ⋮ |

Protected Memory 300

ID Device / Front-End Side a) *Read Access for Scanning & Provision* (Record Info & Data)

b) *Controlled Access via ID device to specific field* (Modifications; Redemption; Deletion etc.)

U.S. PATENT DOCUMENTS

| | | | |
|---|---|---|---|
| 6,216,227 B1* | 4/2001 | Goldstein et al. | 713/172 |
| 6,246,326 B1* | 6/2001 | Wiklof et al. | 340/572.1 |
| 6,354,493 B1* | 3/2002 | Mon | 235/380 |
| 6,496,809 B1* | 12/2002 | Nakfoor | 705/80 |
| 6,690,794 B1* | 2/2004 | Terao et al. | 380/22 |
| 6,842,741 B1* | 1/2005 | Fujimura | 705/59 |
| 6,853,294 B1* | 2/2005 | Ramamurthy et al. | 340/10.1 |
| 6,941,184 B2* | 9/2005 | Ebert | 700/115 |
| 6,992,574 B2* | 1/2006 | Aupperle et al. | 340/505 |
| 6,994,262 B1* | 2/2006 | Warther | 235/492 |
| 7,072,672 B1* | 7/2006 | Vanska et al. | 455/456.3 |
| 2003/0027557 A1* | 2/2003 | Saukkonen et al. | 455/414 |
| 2004/0030658 A1* | 2/2004 | Cruz | 705/65 |
| 2004/0087273 A1* | 5/2004 | Perttila et al. | 455/41.2 |
| 2005/0165695 A1* | 7/2005 | Berardi et al. | 705/64 |
| 2005/0242167 A1* | 11/2005 | Kaario et al. | 235/375 |

FOREIGN PATENT DOCUMENTS

| | | |
|---|---|---|
| JP | 2003-076958 | 3/2003 |
| JP | 2003-242535 | 8/2003 |
| WO | WO 03/107112 A2 | 12/2003 |

OTHER PUBLICATIONS

Gyger et al., "EasyRide: Active Transponders for a Fare Collection System", IEEE, Nov.-Dec. 2001, vol. 21, No. 6, pp. 36-42.

The Office Action dated Feb. 8, 2010 from parallel Japanese Application No. 2007-504491, 8 pages.

Office action dated Feb. 28, 2012 from European Application No. 04 723 269.9, 6 pages.

* cited by examiner

METHOD, DEVICE AND SYSTEM FOR INFORMATION BASED AUTOMATED SELECTIVE DATA HANDLING AND PROVISION BY IDENTIFICATION MEANS

FIELD OF THE INVENTION

The present invention relates to an automated configuration of data provision. More particularly the present invention relates to information based selective configuration of the data provision by an identification means operable with local communication technology.

BACKGROUND

Generally, the present invention addresses the field of local communication technology, such as those short-range communications technologies involving electromagnetic/electrostatic-coupling technology. In one embodiment, electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency (RFID) tags and radio frequency transponder readers also denoted for simplicity as radio frequency (RFID) readers. In another embodiment, visual codes are employed for local communications between a visual encoding means, which is adapted to display bar codes, two-dimensional visual codes and the like, and a counterpart visual scanning means, which is adapted to detect and scan displayed visual codes from such a visual encoding means. The visual codes code information transformed according to a suitable algorithm to visual structures scannable by the visual scanning means. Both introduced embodiments address identification information technology, to which references will be given in the following.

Radio frequency identification (RFID) transponders are widely used for labeling objects, to establish person's identities and to recognize objects provided with radio frequency identification (RFID) transponders. Basically, radio frequency identification (RFID) transponders include an electronic circuit with data storage capacity and a radio frequency (RF) interface and high frequency (HF) interface, respectively, which couples an antenna to the electronic circuit. The radio frequency identification (RFID) transponders are typically accommodated in small containers. Depending on the requirements made on the deployment of the radio frequency identification (RFID) transponders (i.e. the data transmission rate, energy of the interrogation, transmission range etc.) different types are provided for data provision and transmission on different radio frequencies within a range from several 10-100 kHz to some GHz, respectively, (e.g. 134 kHz, 13.56 MHz, 860-928 MHz etc; only for illustration). Two main classes of radio frequency identification (RFID) transponders can be distinguished, i.e. active and passive transponders. Passive radio frequency identification (RFID) transponders are activated by radio frequency identification (RFID) transponder readers generating an interrogation signal, for example a radio frequency (RF) signal at a certain frequency. Active radio frequency identification (RFID) transponders comprise their own power supplies such as batteries or accumulators for energizing.

Payment and ticket applications are considered as one of the most important emerging usage areas that will leverage in radio frequency identification (RFID) technology. For instance, a portable terminal such as a mobile phone implementing a radio frequency identification (RFID) transponder may be utilized to provide/present a digitally coded or electronic ticket, which has been obtained before, to a ticket checkpoint system of an entrance of a public transportation system. The digitally coded ticket is read out by corresponding radio frequency identification (RFID) reader, with which the checkpoint system is equipped, and is analyzed thereby. In case of validity of the digitally coded ticket the access to the public transportation system is granted to the owner of the portable terminal. Advantageously, such a ticket checkpoint system may be available for public transportation systems in various cities, which may result in the requirement for coding different digitally coded tickets. Moreover the illustrated ticket checkpoint system may be extended to similar digitally coded records such as credit card information, loyalty card information, cinema tickets and the like, where the portable terminal performs information exchange with the very same equipment. The same applications may be realized by using visual codes presented by a visual encoding means and a visual scanning means allowing for reading-out the visual codes from the visual encoding means.

It is feasible to store said above illustrated data records in a data storage component, from which a required data record is retrieved on manual user input and provided for being presented via the identification means (i.e. the radio frequency identification (RFID) transponder and visual encoding means, respectively). Nevertheless, such manual handling operated by a user appears to the user as elaborate and clumsy, especially when considering that the number of data records may grow rapidly with the usage. Usability requires the implementation and realization of handling, which is understandable and acceptable by users. Each manual user interaction requires relative high effort and may not be feasible in various places and environments. On vendor side, the acceptance of users is often critical, since the implementation is cost intensive, especially when new technology such as identification technology based payment and/or access systems will have to be introduced. In principle, the better the usability the higher the acceptance of users such that the investment of capital into the new introduced technology amortizes within a satisfactory period of time.

SUMMARY

An object of the present invention is to provide a method and device to automate at a large extent the provision of data records by an identification means by limiting the manual user interaction to the minimum required.

Another object of the present invention is to provide arrangements and systems, which allow performing above stated methodology.

The objects of the present invention are solved by context information based selective provision method for data record selection, which allows substantially automation of the selection operation without any user interaction.

Advantageously, the present invention provides a significant improvement in terms of user experience, as compared to solutions that would utilize a user interface requiring manual interaction of the user. Further, present invention eliminates the need for the end user to ever browse through a huge number of list entries, each entry relating to information about tickets, credit cards etc. stored inside the portable terminal. As a result, even large amounts of information become easily maintainable, encouraging end users to frequently use the portable terminal as the "ticket of choice" and "purse of choice", respectively. Further, there is no requirement for a user to actively perform actions for defining current context for providing input to select appropriate data to an identification device operated for instance by a radio frequency identification device.

With reference to a specific ticket application representing an embodiment of the present invention, the invention provides an easy and simple way of handling and housekeeping of various digital ticket data corresponding to electronic tickets in that means for filtering and/or sorting the digital ticket information are provided, wherein the means ensure that only the relevant ones of these digital tickets will be presented at the front-end of the identification device at a time. Accordingly, a data storage is purposed which is adapted to store a multitude of digital tickets. Digital versions of electronic tickets concern litter problems, can be issued very economically in comparison to physical electronic tickets as there are no material costs and the digital ticket can be sold autonomously, i.e. without the support of manned sales points, or by the means of teller machines reducing the need to service and handle money. The digital versions of electronic tickets representing memory image based digital tickets do not need to be initialized at ticket sales points and thus the threshold of using them is significantly reduced.

According to a first aspect of the present invention, a method for automated information based selective data provision by an identification device is provided. Information data associated with a plurality of data records stored in a data storage are scanned in order to obtain filter information relating to the plurality of data records from the informational data. Then at least one data record out of the plurality of data records is selected. The selection of the data records is obtained on the basis of the obtained filter information which are compared with a predefined filter rule for identifying relevant data records which match with the filter rule. The at least one selected data record is subsequently configured at the identification device and the identification device provides at least one configured data record as an identification information to be retrievable wirelessly by an external inquiring entity.

According to an embodiment of the present invention, the selecting result comprises several selected data record. The external entity supplies an indication which instructs the identification device to provide a next data record out of the several selected data records and correspondingly, the next selected data record is configured at the identification device to be provided as an identification information by the identification device in order to be retrievable wirelessly by the external entity. The indication is part of an anti-collision mechanism, which is applicable with the identification device.

According to a second aspect of the present invention, a method for automated information based selective data maintenance is provided. Informational data associated with a plurality of data records stored in a data storage (300) are scanned ion order to obtain filter information therefrom, which relates to the plurality of data records. At least one data record out of the plurality of data records is selected The selection of the data records is obtained on the basis of the obtained filter information which are compared with a predefined filter rule for identifying invalidated data records matching with the predefined filter rule. Finally, the at least one selected data record is removed from the data storage.

According to a third aspect of the present invention, a method for obtaining a data record applicable for information based selective data provision by an identification device is provided. The data record and informational data associated with the data record is received from a data issuing entity. The received data record is appended to a data storage storing the data record. The data storage is configurable on the basis of configuration data to allow the appending operation of the data record to the data storage in order such that differing data records are applicable for being stored. The informational data relating to the data record are likewise stored. The storage place of the information data may differ. The informational data is applicable for being matched with a predefined filter rule.

According to an embodiment of the present invention, user-originated accessing to the data records stored in the data storage is limited to read operations and/or delete operations.

According to an embodiment of the present invention, identification device originated accessing to the data records stored in the data storage (300) is at least partially permitted. The permission is controllable in accordance with access control information included in the data records.

According to an embodiment of the present invention, the informational data comprises validity information, information about a purpose of usage information about a position. It should be understood that the informational data is not limited to the enumeration above.

According to an embodiment of the present invention, the predefined filter rule comprises time data such as a current time, location/position data such as a current location/position, and/or contextual information. It should be understood that the informational data is not limited to the enumeration above.

According to an embodiment of the present invention, information is obtained from an external source entity. The obtained information serves as the contextual information. Alternatively, information is obtained from the external source entity and subsequently analyzed in order to obtain the contextual information from the obtained information.

According to an embodiment of the present invention, the data record comprises digital ticket information, which in particular includes user information, validity information, purpose of usage digital ticket data, identification sequence data, one time programmable data and/or access control data. It should be understood that the informational data is not limited to the enumeration above.

According to an embodiment of the present invention, at least one data record of the plurality of data records represents a digital image of a data storage of a radio frequency identification device and in particular an electronic ticket equipped with the radio frequency identification device and comprising digital ticket data.

According to a fourth aspect of the invention, computer program product for executing anyone of the aforementioned methods is provided. The computer program product comprises program code sections for carrying out the steps of the method according to an aforementioned embodiment of the invention, when the program is run on a controller, processor-based device, a computer, a terminal, a network device, a portable terminal, a mobile terminal, or a mobile communication enabled terminal. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to a fifth aspect of the invention, a computer program product is provided, which comprises program code sections stored on a machine-readable medium for carrying out the steps of the method according to an aforementioned embodiment of the invention, when the computer program product is run on a controller, processor-based device, a computer, a terminal, a network device, a portable terminal, a mobile terminal, or a mobile communication enabled terminal.

According to a sixth aspect of the invention, a software tool is provided. The software tool comprises program portions for carrying out the operations of the aforementioned methods when the software tool is implemented in a computer program and/or executed.

According to a eighth aspect of the present invention, an electronic device adapted for automated information based selective data provision by an identification device is provided. The device comprises at least a data storage for storing a plurality of data records, a scanning means, a selector means and a configurator means. The scanning means is configured to scan informational data associated with the plurality of data records in order to obtain filter information relating to the plurality of data records. The selector means is configured to select at least one data record out of the plurality of data records. The selection of the data records is obtained on the basis of the obtained filter information which are compared with a predefined filter rule for identifying relevant data records which match with the filter rule. The configurator means serves to configure the at least one selected data record at the identification device, which provides the at least one configured data record as an identification information to be retrievable wirelessly by an external inquiring entity.

According to an embodiment of the present invention, the selecting result comprises several selected data record. The external entity supplies an indication to the identification device, which receives the indication that instructs the identification device to provide a next data record out of the several selected data records. The configurator means serves to configure the next selected data record at the identification device, which provides the next configured data record as identification information to be retrievable wirelessly by the external inquiring entity.

According to a ninth aspect of the present invention, an electronic device adapted for automated information based selective data maintenance is provided. The device comprises at least a data storage for storing a plurality of data records, a scanning means, a selector means and a configurator means. The scanning means is configured to scan informational data associated with the plurality of data records stored in the data storage in order to obtain filter information, which relates to the plurality of data records. The selector means is configured to select at least one data record out of the plurality of data records. The selection of the data records is obtained on the basis of the obtained filter information which are compared with a predefined filter rule for identifying invalidated data records, which match with the filter rule. The configurator means serves to remove the at least one selected data record from the data storage.

According to a tenth aspect of the present invention, an electronic device adapted for obtaining a data record applicable for information based selective data provision by an identification device is provided. The electronic device comprises a data storage, an interfacing means, and a configurator means. The interfacing means is configured to receive the data record and informational data associated with the data record from a data issuing entity. The configurator means serves to append at least the data record to the data storage, which is configurable on the basis of configuration data to allow the appending of the data record to the data storage in order to enable the storing of differing data records. The data storage stores the informational data relating to the data record, which informational data is applicable for being matched with a predefined filter rule.

According to an embodiment of the present invention, the data storage is adapted to limit user originated access to the data records stored in the data storage to read operations and/or delete operations.

According to an embodiment of the present invention, the data storage is adapted to at least partially permit identification device originated access to the data records stored in the data storage. The permission is controllable in accordance with access control information included in the data records.

According to an embodiment of the present invention, the informational data comprises validity information, information about a purpose of usage information about a position. It should be understood that the informational data is not limited to the enumeration above.

According to an embodiment of the present invention, the predefined filter rule comprises time data such as a current time, location/position data such as a current location/position, and/or contextual information. It should be understood that the informational data is not limited to the enumeration above.

According to an embodiment of the present invention, the data record comprises digital ticket information, which in particular includes user information, validity information, purpose of usage digital ticket data, identification sequence data, one time programmable data and/or access control data. It should be understood that the informational data is not limited to the enumeration above.

According to an embodiment of the present invention, at least one data record of the plurality of data records represents a digital image of a data storage of a radio frequency identification device and in particular an electronic ticket equipped with the radio frequency identification device and comprising digital ticket data.

According to an embodiment of the present invention, the electronic device is any kind of portable device, which is preferably a microprocessor-based electronic device. Alternatively, the electronic device is identical with the identification device.

According to an embodiment of the present invention, the portable device is adapted to obtain contextual information with the help of a context information acquisition means. The contextual information is provided by external source entities and/or the contextual information is obtainable on the basis of the information provided by the external source entities.

According to a tenth aspect of the present invention, a system for automated information based selective data provision and handling is provided. The system comprises at least a portable device and an identification device. Either the portable device or the identification device corresponds to the electronic device mentioned above.

BRIEF DESCRIPTION OF THE DRAWINGS

The accompanying drawings are included to provide a further understanding of the invention and are incorporated in and constitute a part of this specification. The drawings illustrate embodiments of the present invention and together with the description serve to explain the principles of the invention. In the drawings.

DETAILED DESCRIPTION OF EMBODIMENTS OF THE INVENTION

Reference will be made in detail to the embodiments of the invention examples of which are illustrated in the accompanying drawings. Wherever possible same reference numbers are used throughout drawings and description to refer to similar or like parts.

The inventive methodology for automated information based selective data provision of data records representing digital information about ticket data and/or payment data will be described on the basis of a method according to an embodiment of the present invention. The data record relating to ticket information shall be understood as information comprising digitally coded data concerning information about for instance a digital ticket for accessing an event, an exhibition, a public transportation system, a cinema, a theatre, an opera, a concert and the like for being used at a checkpoint to authenticate access permission. The data record relating to payment information shall be understood as information comprising digitally coded data in accordance with information about for instance a credit card, a loyalty card, an electronic payment card, an electronic cash card, a debit card, a prepaid card, a coupon, a voucher, an Euro-cheque card, a vendor-specific payment card and the like for being used by a customer in conjunction with the payment for commodities.

It shall be noted that the inventive methodology may be applied to any similar or related applications such as access control to hotel rooms, access control to rented cars, user control and user account management for libraries and the like. Indeed, a broad number of similar or related applications can take advantages of the inventive concept. A selection of example usage cases will be enlightened below.

At first, an introduction to functional and structural components, which may implemented in a portable consumer electronic (CE) device and identification devices operable with embodiments of the inventive concept, will be presented and described in detail.

Figure 1A:
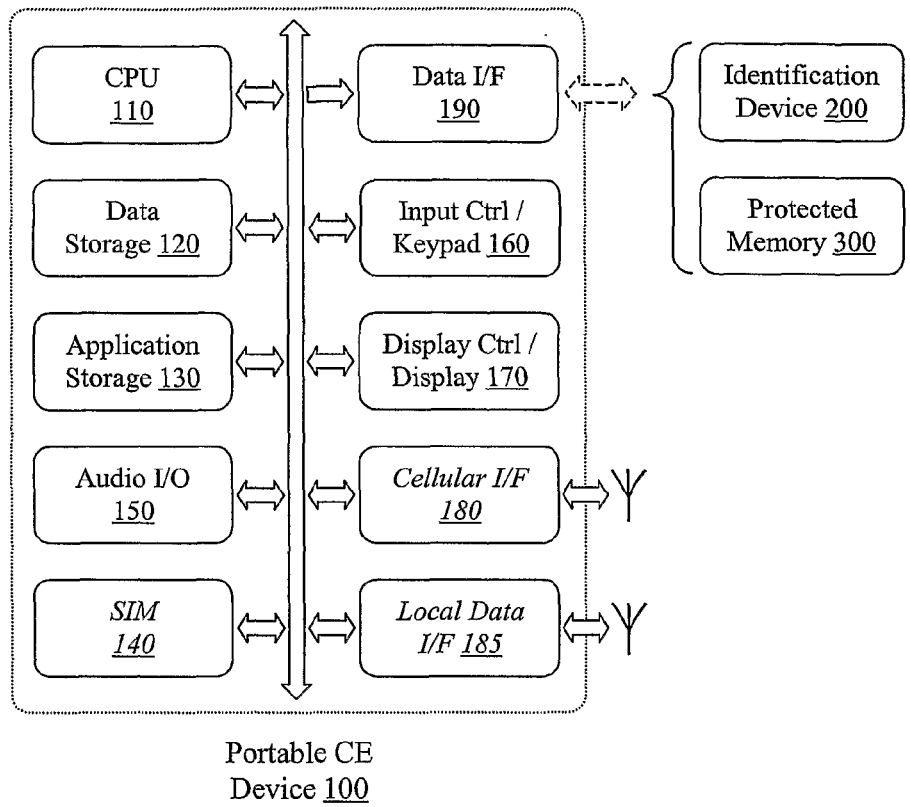
FIG. 1a illustrates schematically a block diagram including functional and structural components of a portable consumer electronic (CE) device according to an embodiment of the present invention.

FIG. 1a illustrates schematically an implementation of a portable consumer electronic (CE) device being equipped with a RFID device according to an embodiment of the present invention.

The block diagram of FIG. 1a illustrates a principle structural design of a cellular terminal, which should exemplary represent any kind of portable CE device 100 employable with the present invention. It shall be understood that the present invention is not limited to any specific kind of portable CE device such as that illustrated. The illustrated portable CE device 100 comprises typically a central processing unit (CPU) 110, a data storage 120, an application storage 130, input/output means including audio input/output (I/O) means 150, a keypad with input controller (Ctrl) 160 and a display with display controller (Ctrl) 170.

Additionally, the portable CE device 100 according to an embodiment of the present invention includes a cellular interface (I/F) 180 coupled to a cellular antenna and operable with a corresponding subscriber identification module (SIM) 140. Moreover, the portable CE device 100 according to an embodiment of the present invention comprises also a local data interface (I/F) 185 and a general data interface (I/F) 190.

The local (short-range) data interface (I/F) 185 or local (short-range) transceiver may be additionally implemented in portable CE device 100 to provide for local data communication with a corresponding counterpart network, base station or transceiver. In general, the local data interface (I/F) 185 can be realized by a low-power radio frequency (LPRF) transceiver such as a Bluetooth transceiver, a WLAN (wireless local area network) transceiver, an ultra-wide band (UWB) transceiver or any other transceiver operable with an IEEE 802.xx standard. Moreover, the local data interface (I/F) 185 can be also implemented as an infrared-based interface such as an IrDA (infrared direct access) interface or an interface being based on radio frequency identification (RFID) technology, namely RFID reader, RFID transponder and near field communication (NFC) standard, respectively.

The cellular interface (I/F) 180 is arranged as a cellular transceiver to receive signals from the cellular antenna, decodes the signals, demodulates them and also reduces them to the base band frequency. The cellular interface 180 provides for an over-the-air interface, which serves in conjunction with the subscriber identification module (SIM) 140 for cellular communications with a corresponding radio access network (RAN) of a public land mobile network (PLMN). The output of the cellular interface (I/F) 180 thus consists of a stream of data that may require further processing by the central processing unit (CPU) 110. The cellular interface (I/F) 180 arranged as a cellular transceiver also receives data from the central processing unit (CPU) 110, which are to be transmitted via the over-the-air interface to the radio access network (RAN). Therefore, the cellular interface (I/F) 180 encodes, modulates and converts the signal to the radio frequency, which is to be used. The cellular antenna then transmits the resulting radio frequency signal to the corresponding radio access network (RAN) of the public land mobile network (PLMN).

The display and display controller (Ctrl) 170 are controlled by the central processing unit (CPU) 110 and provides information for the user typically by the means of a user interface. The keypad and keypad controller (Ctrl) 160 are provided to allow the user to input information. The information input via the keypad is supplied to the central processing unit (CPU) 110, which may be controlled in accordance with the input information. The audio input/output (I/O) means 150 includes at least a speaker for reproducing an audio signal and a microphone for recording an audio signal. The central processing unit (CPU) 110 may control the conversion of audio data to audio output signals and the conversion of audio input signals into audio data, where the audio data have a suitable format for cellular transmission.

The identification device 200 is operable with the aforementioned portable CE device 100 embodied as cellular phone for the way of illustration. According to an embodiment of the present invention, the illustrated identification device 200 may be implemented as a radio frequency identification (RFID) device 200, which includes at least a transponder logic, which serves for the operation of the RFID device 200, a transponder memory 220 for storing data information for being communicated via the RFID device 200 and a transponder antenna. The detailed set-up and operation will be described with reference to FIGS. 1b and 1c, which depict embodiments of the identification device 200 on the basis of radio frequency identification technology. Nevertheless, it shall be noted that according to another embodiment of the present invention the identification device 200 may be a visual encoding means for displaying a bar codes, related two-dimensional visual codes and similar codes, respectively.

The identification device 200 may be implemented in, attached to or coupled to the portable CE device 100 according to embodiments of the present invention. For instance, the identification device 200 may be provided externally to the portable CE device 100 integrated into a detachable functional cover. This means that the cover, when attached to the portable CE device 100, provides for identification functionality.

In general, the identification device 200 is connectable with the portable CE device 100 via a dedicated data interface (I/F) 190. The data interface (I/F) 190 serves for interfacing data and instruction communications between the identification device 200 and the portable CE device 100. The data interface (I/F) 190 may be established by any appropriate hardware and/or software interfaces, which are available in the state of the art or in future.

The portable CE device 100 further comprises a protected memory 300, which is adapted for storing a plurality of data records. Alternatively, the protected memory 300 may be comprised by the identification device 200. As defined above, each data record shall be understood as a digital representation of information relating to for instance digital ticket data and digital payment data according to an embodiment of the present invention. The protected memory 300 is specifically adapted to meet requirements, which have to be considered to ensure security and privacy aspects relevant in view of the sensitive digital information stored therein. Those skilled in the art will appreciate that the handling of the sensitive digital information such as digital ticket data and digital payment data as defined above is subjected to security and privacy aspects from user view as well as from service provider view, where the service provider relates to both issuing authorities and accepting authorities of the digital information in question.

The security aspects primarily relate to the prevention of misuse and/or manipulation of the sensitive digital information by the user or any third party, which may for instance gain unauthorized access to clone, read, copy, modify etc the sensitive digital information in question. The protected memory 300 is primarily adapted to limit the access operable with the user interface of the portable CE device 100 with respect to the security and privacy aspects, but enables access operable via the identification device 200 for suitable operativeness with the stored sensitive digital information as required by the applicational usage of the sensitive digital information. This means, the limited access to the protected memory 300 is implemented in such a way that handling of the stored sensitive digital information in view of user requirements remains adequately, while maintaining the security aspects defined in conjunction with the sensitive digital information in question. The limitations in the access to the protected memory 300 will become clearer, when reading the following embodiment below relating to the inventive concept.

In general, the portable CE device 100 described above may anyone of the example devices comprising illustratively a portable phone, a personal digital assistant, a pocket personal computer, a portable personal computer, a communicator terminal or any other portable consumer electronics (CE) with processing capability and appropriate communication means; i.e. comprising at least an identification device 200. In general the portable CE device 100 embodies a processor-based device, which allows implementation of the inventive concept. The following embodiment will illustrate enhanced identification device operation, which is for instance implementable in each of the aforementioned consumer electronic (CE) devices. However, illustration of the identification device will be given with respect to illustrated portable CE device 100, which has attached or has embedded such an identification device. But it shall be noted that the invention is not specifically limited to those identification devices and to portable CE device coupled thereto, respectively, which are herein illustrated merely for the way of illustration on the basis of embodiments according to the present invention.

Figure 1B:
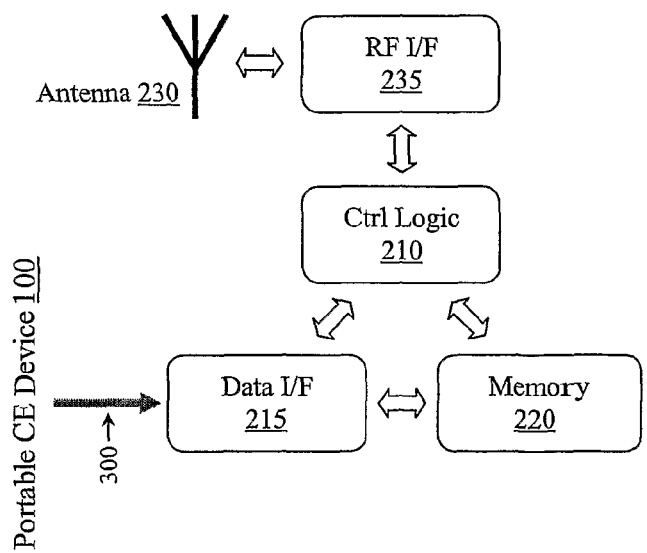
FIG. 1b illustrates schematically a block diagram including functional and structural components of a radio frequency identification (RFID) device according to an embodiment of the present invention.

FIG. 1b illustrates schematically an implementation of a radio frequency identification (RFID) device according to an embodiment of the present invention. The RFID device of FIG. 1b is adapted to be connectable with any kind of portable CE device; particularly, the portable CE device 100 as described above. The illustrated RFID device may be embodied with a configurable transponder memory 220.

In detail, the illustrated RFID device includes a transponder logic 210, which serves for the operation of the RFID device, a transponder memory 220 for storing data for being communicated via the RFID device and an antenna 230. The transponder logic 210 is connected to the antenna 230 via a radio frequency (RF) interface 235 and the antenna 230 is adapted to the predetermined radio frequency/frequencies (RF) deployed for operating.

The radio frequency (RF) interface 235 and the antenna 230 are adequately adapted to receive one or more interrogation signals and to transmit one or more response signals carrying data retrieved from the transponder memory 220 stored therein.

The antenna 230 is connected to the radio frequency (RF) interface 235, which supplies RF signals generated by the radio frequency (RF) interface 235 to the antenna 230 and which accepts RF signals received by the antenna 230. The radio frequency (RF) interface 235 is responsible for both modulating and demodulating of the signals to be transmitted and received by the antenna 230, respectively.

The radio frequency (RF) interface 235 is typically capable to transmit demodulated signals to the transponder logic 210 and to receive signals from the transponder logic 210 to be modulated and transmitted. More particularly, the radio frequency (RF) interface 235 provides further signals necessary for the operation of the transponder logic 210, which are in detail a power supply signal (voltage signal) and a clock signal. The power supply signal is obtained from the coupling of the interrogating electromagnetic field into the antenna 230, whereas the clock signal is obtained from the demodulator comprised in the radio frequency (RF) interface 235. The power supply signal and the clock signal are obligate for operating the transponder logic 210, which is energized by interrogating signal emitted by an external interrogating entity, preferably, a corresponding radio frequency identification (RFID) reader entity.

The transponder logic 210 is coupled to an interface, herein a data interface (I/F) 215, which is coupled via connection 300 to allow reception of data from the portable CE device 100 having the corresponding data interface (I/F) 190. The data received from the portable CE device 100 serve to configure the transponder memory 220. The data interface (I/F) 215 interfacing between reader logic 210 and the embodied cellular phone may be established by appropriate hardware and/or software interfaces. Additionally, the data interface (I/F) 215 may integrate a power interface, which is supplied with power by the coupled portable CE device 100 and energizes the RFID transponder as long as the portable CE device 100 provides power supply.

The transponder memory 220 stores the data, which is retrievable by a corresponding radio frequency identification (RFID) reader entity. Accordingly, the transponder memory 220 is connected to transponder logic 210 and the transponder memory 220 is implemented as a configurable memory. Various storage technologies are available to implement a configurable memory and in particular non-volatile configurable storage technologies are applicable therefor. The configurable transponder memory 220 is under control of the transponder logic 210. Therefore, the transponder logic 210 is coupled via data interface (I/F) 215 to the data interface (I/F) 190 of the portable CE device 100. Data received by the transponder logic via data interface (I/F) 215 are supplied to the transponder memory 220 to be stored therein.

The RFID device illustrated in FIG. 1b may be attached to or embedded in any portable CE device 100 embodied above for the way of illustration. The RFID device may be provided with a data interface (I/F) 215 such as a serial interface, a proprietary interface or any kind of known data interface, which is adapted to interface between the RFID device and the portable CE device 100 having the data interface (I/F) 190, which corresponds to the data interface (I/F) 215. Applications executed on the portable CE device 100 can use the functionality of the RFID device. An application program interface (API) layer may support the communication between applications run on the portable CE device 100 and the RFID device.

It shall be noted that the embodiment of the RFID device shown in FIG. 1b illustrates one possible embodiment thereof. The depicted (logic and memory) units shall represent functional units. Those skilled in the art will appreciate on the basis of the description given above that the functional units may be composed in another way while still allowing the functionality of the identification device.

Figure 1C:
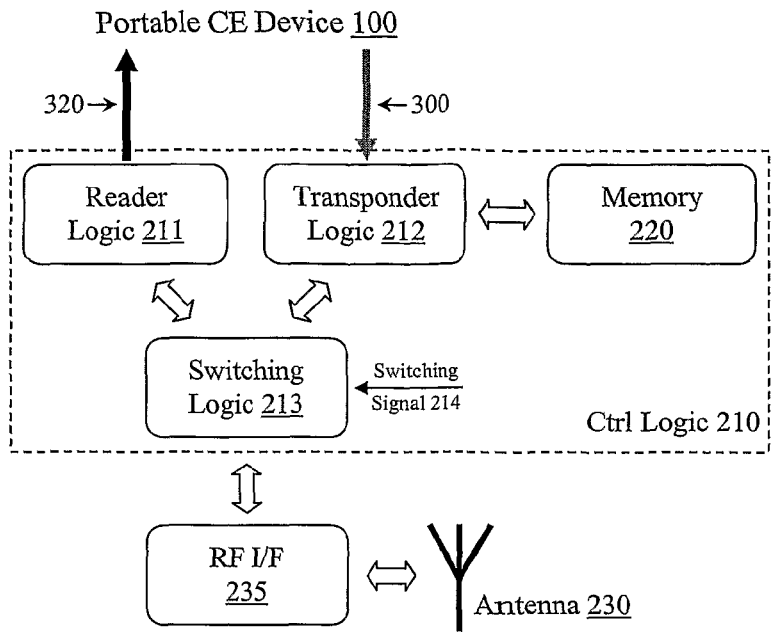
FIG. 1c illustrates schematically a block diagram including functional and structural components of a radio frequency identification (RFID) device according to another embodiment of the present invention.

FIG. 1c shows a diagram of functional blocks, on the basis of which a RFID device with transponder functionality and reader functionality is realizable. The schematically illustrated RFID device includes a RFID reader logic 211, which shall represent the RFID reader functionality, and a RFID transponder logic 212, which shall represent the RFID transponder functionality. Both functional logic units, i.e. the RFID reader logic 211 as well as the RFID transponder logic 212, require a radio frequency (RF) interface (I/F) 235 and an antenna 230 adapted to the radio frequency (RF) deployed for operating. The embodiment illustrated in FIG. 1c purposes to use a common radio frequency (RF) interface (I/F) 235 and a common antenna 230 for utilization by both functional logic units. It shall be understood that the radio frequency (RF) interface (I/F) 235 as well as the antenna 230, which are presented in the present description according to embodiment of the invention, are adapted to employ any suitable radio frequency/frequencies used in the field of radio frequency identification technology. In particular, at least typical operation frequencies aforementioned shall be realizable with the help of embodiments of the present invention.

In case of RFID reader functionality the antenna 230 is adapted to emit one or more interrogation signals and to receive one or more response signals for retrieving information from a corresponding RFID transponder.

In case of RFID transponder functionality the antenna 230 is adequate to receive one or more interrogation signals and to emit one or more response signals carrying data retrieved from the interrogated RFID transponder and transponder memory 220 thereof, respectively.

The antenna 230 is connected to the radio frequency (RF) interface (I/F) 235 via one or more signal connections, which supply RF signals generated by the radio frequency (RF) interface (I/F) 235 to the antenna 230 and which accepts RF signals received by the antenna 230.

The radio frequency (RF) interface (I/F) 235 is responsible for both modulating and demodulating the signals to be transmitted and received by the antenna 230, respectively. Therefore, the radio frequency (RF) interface (I/F) 235 couples to the RFID reader logic 211 and the RFID transponder logic 212, respectively. In particular, the radio frequency (RF) interface (I/F) 235 receives from the RFID reader logic 211 signals to be modulated and transmitted and transmits demodulated signals to RFID reader logic 211. Additional, the radio frequency (RF) interface (I/F) 235 also transmits demodulated signals to the RFID transponder logic 211 and receives signals from the RFID transponder logic 211 to be modulated and transmitted. More particularly, the RF interface provides further signals necessary for the operation of the RFID transponder logic 211, which are in detail a power supply signal (voltage signal) and a clock signal. The power supply signal is gained from the coupling of the interrogating electromagnetic field, whereas the clock signal is obtained from the demodulator comprised in the radio frequency (RF) interface (I/F) 235. The power supply signal and the clock signal may obligate for operating the RFID transponder logic 212, respectively, especially in case the illustrated RFID device shall simulate a passive RFID transponder energized by an interrogating signal of a RFID reader device.

The RFID device illustrated in FIG. 1c comprises moreover a switching logic 213, which is operated to switch between RFID reader functionality and RFID transponder functionality. The switching logic 213 is interposed between RFID reader logic 211, RFID transponder logic 212 and radio frequency (RF) interface (I/F) 235 and operated with a switching input for being supplied with a switching signal 214 generated by the portable CE device 100. In detail, the switching logic 213 is operable to couple either the RFID reader logic 211 to the radio frequency (RF) interface (I/F) 235 or the RFID transponder logic 212 to the radio frequency (RF) interface (I/F) 235. Correspondingly in dependence on the switching state or position of the switching logic 213, RFID reader functionality or RFID transponder functionality is available.

The RFID device and hence the RFID reader logic 211 is provided with an interface indicated by communication connections 320 to allow an application, which is operated on the portable CE device for communication with the RFID device and in particular with RFID reader logic 211, respectively. The interface interfacing between RFID device and the portable CE device is established by appropriate hardware and software interfaces that allow access to the RFID device.

The implemented RFID reader logic 211 allows for RFID reader functionality as described above. Additionally, the RFID reader logic 211 may be adapted for RFID writer functionality. That means, a RFID reader with reader functionality is adapted to retrieve information stored in one or more RFID transponders. The reader functionality is at least the basic functionality of a RFID reader. A RFID reader with writer functionality is adapted to add information to RFID transponders to be stored therein and/or modify information stored in RFID transponders. It shall be noted that the adding and/or modifying of information stored in RFID transponders depends on the capability of the RFID transponders and/or authorization of the RFID reader. The writer functionality is an enhanced functionality of a RFID reader.

The RFID transponder functionality as described above may be employed to establish a communication mode, which shall be denoted as show communication mode. In the show communication mode the RFID transponder functionality is switched while the RFID reader functionality is switched-off, i.e. is out of operation. The show communication mode is distinguished from the known communication modes therein that the RFID transponder functionality provides the physical advantage of passive RFID transponders, which do not require any internal power supply. The illustrated show communication mode primarily takes into account the requirement to provide for RFID transponder functionality even in case the RFID device is not energized by an external/internal power supply but energized by an interrogating signal, which can only server for a limited power supply. This means, the RFID transponder functionality may be active by default in case the RFID device is powered down and the REID device operates with the RFID reader functionality in case the RFID device 100 is powered up. In an embodiment of the invention, the portable CE device 100, which comprises (internally or externally) the RFID device, energizes the RFID device, in case the portable CE device 100 is powered up (switched on). Consequently, in case the portable CE device 100 is switched on, the RFID reader functionality is active and in case the portable CE device is switched off, the RFID transponder functionality is active. Nevertheless, the switching logic allows changing the functionality between RFID reader functionality and RFID transponder functionality at any time if required and in case the RFID device is energized.

The information stored in the RFID device that can be retrieved by a corresponding RFID reader entity as illustrated above is stored in an adequate storage component such as a transponder memory 220. The storage component may be a read-only storage component or a configurable storage component. In case of a configurable storage component a number of storage technologies are applicable and in particular non-volatile configurable storage technologies are of interest.

The RFID device and hence the RFID transponder logic 212 may also be provided with an interface indicated by communication connections 300 to allow applications, which are operable with the portable CE device 100 for supplying data to the RFID device and in particular to RFID transponder logic 212 having the transponder memory 220, respectively. The data interface interfacing between RFID device and the portable CE device 100 may be established by appropriate hardware and software interfaces that allow access to the RFID device.

In analogy to FIG. 1*b*, it shall be assumed that the RFID device as embodied in FIG. 1*c* is attached to or embedded in a portable CE device 100. Conventionally, the RFID device may be provided with an interface such as a serial interface interfacing data exchanged between the RFID device and the portable CE device 100 such that applications executed on the portable CE device 100 can use the functionality, which is provided by the RFID device. An application program interface (API) layer may support the communication between applications operated on the portable CE device 100 and the RFID device.

Figure 2:
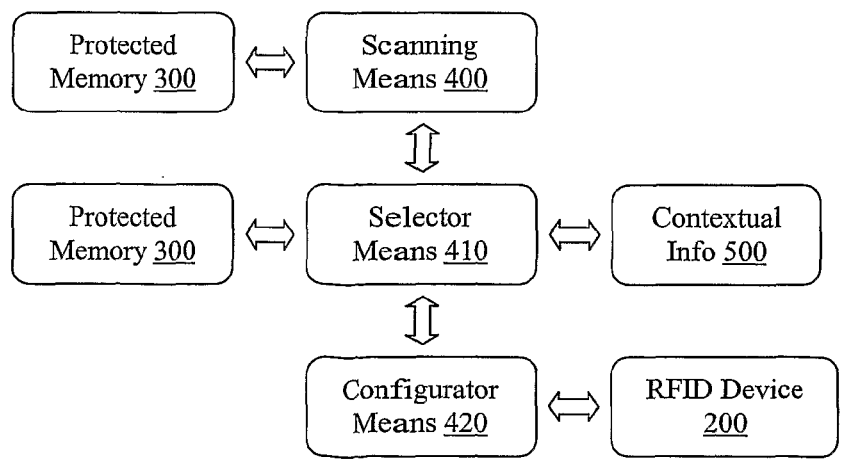
FIG. 2 illustrates schematically a block diagram including functional components operable with an operational sequence for automated information based selective data provision according to an embodiment of the present invention.

The following description relates to functional components implemented in the portable CE device 100 and/or the identification device 200, respectively, to enable the inventive concept of the present invention according to an embodiment thereof and the structuring and organization of the digital information and the protected memory 300 storing the digital information thereof. The description will be given with respect to digital ticket information, which serves as one specific example of digital information in question, to which the present invention relates in general. FIG. 2 illustrates schematically functional components operable with the protected memory 300 described above.

The function components include a scanning means 400, a selector means 410 and a configurator means 420. The scanning means 400 is operable with data records stored in protected memory 300 and/or further information associated with the stored data records. The scanning means 400 is adapted to extract specific filter information from the stored data records and/or further information associated therewith. On the basis of the filter information extracted by the scanning means 400, the selector means 410 is operable with filter and/or sorting rules defining conditions for filtering and/or sorting, in accordance with which on or more data records are selected out of the plurality of data records stored in the protected memory 300. This means, the filter information are filtered and/or sorted in accordance with filter rules and sorting rules, respectively, and those data records are selected, which are associated with matching filter information resulting from the filtering and/or sorting operation. The configurator means 420 is at least adapted to configure the identification device 200 with the one or more selected data records for being provided therewith.

In order to describe the functionality of the components illustrated in FIG. 2 in more detail, the organization of the data records and the protected memory 300 will be described with reference to FIGS. 3*a* and 3*b*. Back references to FIG. 2 will be made in conjunction with the description relating to the operational sequences referred to with reference to FIGS. 4*a* and 4*b*.

Conventionally, electronic tickets are used today as separate physical electronic tickets preferably implemented as passive RFID transponders, magnetic storage media such as magnetic strips on paper tickets etc. Since the security of these electronic tickets is limited, these electronic tickets are used in applications, where the fraud and security requirements have corresponding level. This means, the usage is limited up to now by the value of the electronic ticket, the time/period of validity of the electronic ticket and are deployed for instance in conjunction with public transportation systems, for one time access to an event, non-payment related data like loyalty cards etc. The inventive concept is directed to the realization of a portable CE device 100 and an identification device 200, respectively, which is provided with a facility to store for instance digital contents of such electronic tickets as memory images in order to replace physical electronic tickets. For example, the storing of the digital contents of electronic tickets as memory images allows to handle several electronic tickets with the portable CE device 100 and the identification device 200 at the same time, omitting the requirement to provide separately one time usable digital tickets for each specific application. Moreover, the concept provides a flexible configurable storage, which is adaptable to different digital contents of electronic tickets, i.e. different coding, format, size etc.

Electronic tickets and their digital contents will be described in detail below according to an embodiment of the present invention. The aforementioned data records are applicable to comprise digital images of such digital tickets, which serve as a usage case in accordance with an embodiment of the present invention.

Figure 3A:
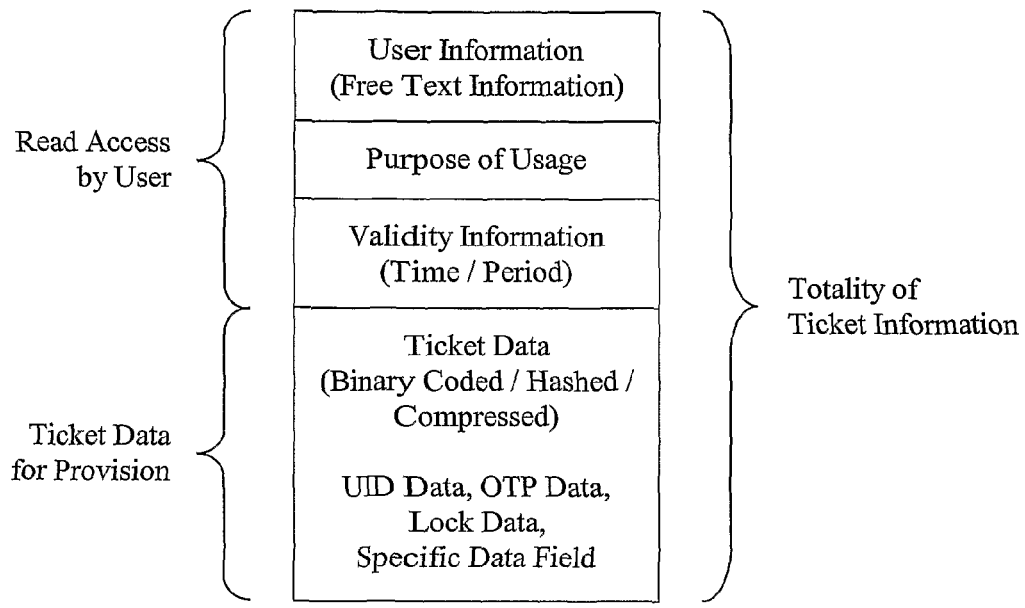
FIG. 3a illustrates schematically structured ticket information according an embodiment of the present invention.

With reference to FIG. 3a, the digital information about an electronic ticket according to an embodiment of the present invention should comprise several individual parts including user information, information about the purpose of usage, validity information, and ticket data.

The user information serves as a free text information, which includes preferably displayable free text information about general information relating to the electronic ticket, the purpose, the issuer, the ticket source, ticket acceptors etc. This means, the user information comprises preferably merely information informing the user about the electronic ticket. The user information may be comparable with the informational contents, which are printed on traditional paper-form tickets, stored in magnetic strips attached to paper-form tickets or conventional one-time electronic tickets.

The purpose of usage comprises for instance a designation relating to the purpose of the electronic ticket such as an identification information about the acceptor such as a transportation system of a defined city, region etc. Moreover, the purpose of usage may comprise an identification information about the event such as a film show, a sports event, stage play, a music performance etc and the like. The validity information comprises information about for instance date of validity; a point in time of validity; a period of validity; a start point in time; and an end point in time of validity.

At least one of the user information and the purpose of usage as well as the validity information may serve as information, which is adequate to inform the user of the portable CE device 100 about the stored electronic tickets and on the basis of which the user is enabled to handle the digital ticket information, which is stored as data records in the protected memory 300.

Additionally, the ticket information comprises the digital ticket data itself, which is to be provided via the identification device 200 to enable the expected application of the electronic ticket itself in the designated manner for electronic tickets. Therefore, the digital ticket data comprises any data required for enabling the ticket application. This means, the contents of the ticket data is predefined by the applicational usage and the digital ticket data represents an appropriate electronic ticket. Without limiting, the informational contents of the aforementioned user-readable information as well as the ticket data may overlap. In accordance with the example ticket information illustrated exemplary herein with reference to FIG. 3a, the ticket data should comprises information about the purpose of usage and information about the validity as aforementioned.

In principle, the digital ticket data should be protected against any kind of access operations originating from the user, which relates primarily to write, copy, clone or modification operations for instance initiated by user input via the user interface operable with the portable CE device 100. The prohibition of such user-originated access to the digital ticket data meets the requirements in the view of security aspects.

For security aspects, primarily for anti-cloning purposes, the ticket data should be additionally associated with an identification or identifier, preferably a unique identification (UID) such as unique serial number or any other unique data sequence. Such a unique identification is conventionally employed to code the ticket data as hashed data, which bounds the ticket data to the specific unique identification and which ensures that the ticket data is protected against any kind of unauthorized modifications. Such identification as described above may also be used for crypto-graphically secured ticket data and may allow to derive diversified keys per ticket data for an appropriate crypto-graphic system.

Additionally, the ticket data may comprise supplementary data such as a one time programmable (OTP) field or area, which is applicable for once write operations e.g. for a one time counter having a predefined bit length, for permanent de-validation (redemption) of the ticket data etc. Such a one time programmable counter is applicable for instance to realize a strip ticket function known in conjunction with multiple tickets for public transportation systems.

Further specific data field may be also provided with the ticket data. For example, field programmable read-only locking data may be included, which is applicable to define fix data of the ticket data to unchangeable values. Alternatively, field programmable write-once data may be included, which is applicable to define data of the ticket data, which is allowed to be written once or which is allowed to be set either to digital "0" or to digital "1".

In addition, the ticket data may also be binary coded in accordance with any suitable data coding methodology and/or the ticket data may be coded to optimize the required storage space for storing, which is known in the art as compressing.

Conclusively, it shall be noted that the ticket information may designate the totality of digital information associated with an electronic ticket, whereas the ticket data is a subset of the digital information and comprises that part of the digital contents of the electronic ticket, which is to be provided via the identification device 200, when required and wished, respectively.

It shall be further understood that data records illustrated herein in view of electronic tickets includes in principle two parts. A first part comprises user information, which is dedicated for informing the user about the data record and to enable the information based selective data handling and provision. A second part comprises sensitive data, herein ticket data, which is subjected to security aspects. The sensitive data includes and corresponds to the actual data, respectively, which is dedicated for being provided via the identification device 200 to an external data inquiring entity such as a digital ticket redemption machine. Therefore, the sensitive data is preferably hashed, compressed and/or coded in accordance with any adequately applicable data-coding format to meet security and/or format requirements.

Conclusively, aforementioned first part will be designated in the following as informational data whereas the second part will be designated as sensitive data indicating the subjection to security requirements.

In general, the organization and structuring of the digital contents of data relating to electronic ticket information and/or electronic payment information is not standardized. There is also no need for standardization in the aforementioned filed, for instance due to the fact that in one embodiment of the present invention each digital ticket issuing entity may prefer its own format and coding, respectively, to meet own specific requirements and necessities. Nevertheless, a standardized format and/or coding of the data records stored in the protected memory is not necessary. With reference to following FIG. 4a, the skilled reader is taught that the protected memory can be configured individually to enable the storing of differing individual data records, i.e. data records differing in size, coding, format etc.

Moreover, those skilled in the art will appreciate that the aforementioned structuring of the digital contents illustrated on the basis of an electronic ticket data and its digital contents represents an idealistic structuring of the data records, respectively, which is adapted to one specific embodiment of the present invention.

Alternatively in one embodiment of the present invention, the aforementioned informational data such as user information, purpose of usage and validity information may have to be extracted from the sensitive data, respectively, which may represent digital ticket data or digital payment data as defined above for the way of illustration. The extracting of the informational data, which will be required for automated information based selective data handling and provision is part of the functionality of the scanning means 400 described briefly above. This means, the scanning means is adapted to the extracting functionality, which results in informational data deployable for filtering, sorting and selection operations.

Moreover, the aforementioned informational data such as user information, purpose of usage and validity information may be provided separately to the sensitive data (i.e. data record), respectively, stored in the protected memory 300. According to another embodiment of the invention, the informational data relating to a description of the contents and purpose of the data record can be stored separately to the data record stored in the protected memory 300. The separation of the informational data and the data record (sensitive data) may imply the possibility of to store the informational data at a data storage different from the protected memory 300.

Referring exemplary to the ticket application described above, the digital ticket data transmitted by a ticket issuing entity represents the sensitive data, which is stored in the protected memory 300. The digital ticket data are accompanied with informational data in form of clear text information relating for instance to the content description as written today on paper-form tickets or on the casing of electronic tickets.

Figure 3B:
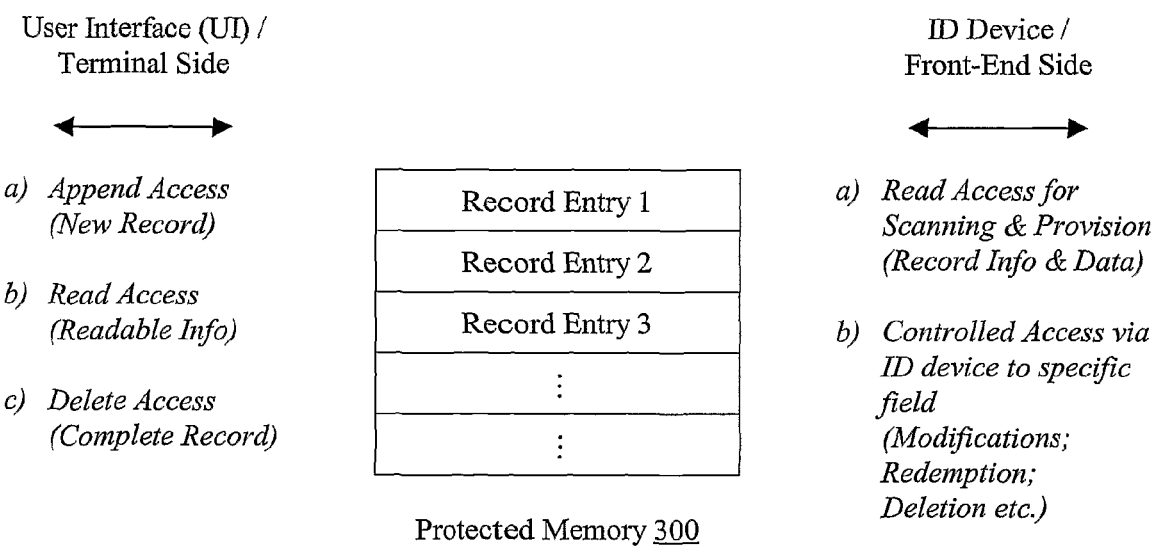
FIG. 3b illustrates schematically an organization of a protected memory for storing digital ticket information according an embodiment of the present invention.

FIG. 3*b* relates to the organization of the protected memory 300, which is adapted to store several data records, which may represent digital images of electronic/digital tickets as described in detail above. With reference to FIG. 3*b*, each data record is designated as record entry. The protected memory is adapted to store differing data records, for instance data records, which differ in the storage space required for storing due to different digital contents and coding. As aforementioned, the data record may comprise both the informational data and the sensitive data or may comprise only the sensitive data, which is intended for provision via the identification device 200.

With reference to FIG. 1*a* to 1*c*, the protected memory 300 may be a dedicated data storage attached or implemented in the identification device 200, may be included in the transponder memory 220, may be part of the transponder memory 220 or my be also identical with the transponder memory 220.

The user access to the protected memory 300 and the data records stored therein is limited, respectively. This means, the user is allowed by the means of the user interface operable with the portable CE device 100 to append a new data record to the protected memory 300, to read information comprised by the data records and/or to delete a complete data record. In an non-limiting embodiment according to the present invention, the user access relating to a read operation is limited to the informational data which is enabled to be readable by the user via the user interface. Such a limitation of the read access may be obtained by an at least partially coding and encrypting of the sensitive data, respectively.

In contrast to the limited user-originated access, access to the protected memory 300 and data records stored therein, respectively, which originates from an authorized entity via the identification device 200, may be allowed to at least specifically defined alterable fields of the data records. Such identification device originated access is required to enable for instance deletion of a data record, de-validation of a data record or to program one time programmable (OTP) fields. As stated above, the data record may comprise access control data operable with identification device originated access to the data record and defining access control rules that relate to an allowance and a prohibition of identification device originated access, respectively.

In view of the aforementioned structuring of data in question into informational and sensitive data illustrated in conjunction with the example digital ticket data and the organization of the protected memory 300, the portable CE device 100 or the identification device 200, which is provided with scanning and selector means 400 and 410, is capable to parse, sort and filter the data records.

For example in case one of the data records stored by the protected memory 300 represents an digital concert ticket that will be valid on any future date, the digital ticket data will not be provided by the identification device 200 before that future date. Further, in case a digital bus ticket is associated with the digital concert ticket, the digital bus ticket only valid on the date of validity of the digital concert ticket. Consequently, the digital bus ticket is likewise not provided by the identification device 200 to an electronic bus ticket redemption machine or to any other redemption machine before the date or time of validity associated with the digital concert ticket. So, in other words, the information provided with digital tickets stored in the protected memory 300 is deployed as input for the automated handling of the ticket information by the portable CE device 100.

Figure 4A:
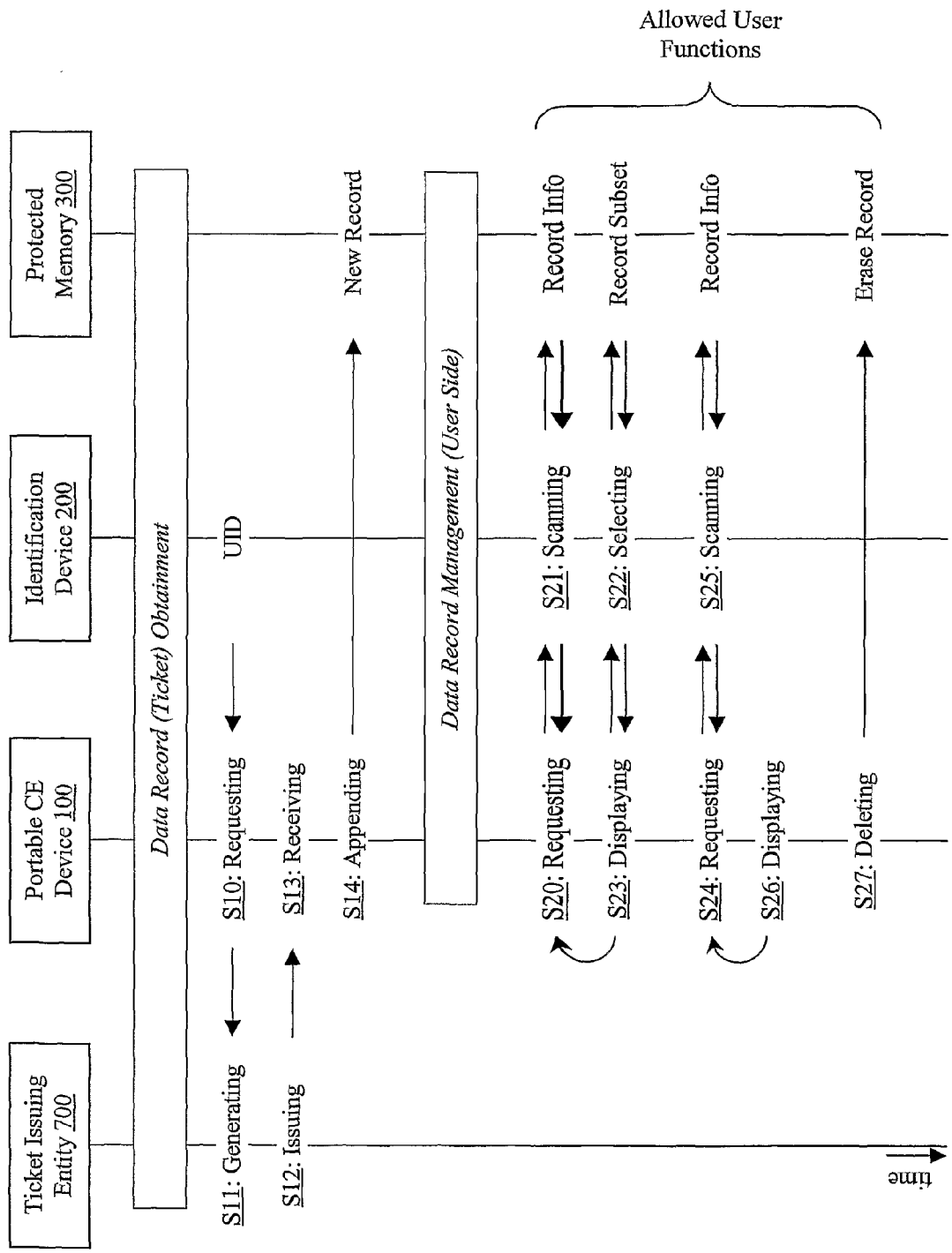
FIG. 4a illustrates schematically a first operational sequence for automated information based selective data provision according to an embodiment of the present invention.

With reference to FIG. 4*a*, a first operational sequence in accordance with the inventive concept of the present invention shall be described.

A first set of operations relates to the obtaining of a data record embodied as digital ticket data according to an embodiment of the invention.

In an operation S10, the user may employ his portable CE device 100, which includes by the way of illustration a cellular interface, to generate and transmit a request to order a digital ticket from a ticket provider, which is herein designated as ticket issuing entity 700. The request for the digital ticket may be coded as a message using the short message service (SMS) or the multimedia message service (MMS) of a public land mobile network (PLMN) or any other messaging service. In response to the request the ticket issuing entity 700 generates in an operation S11 and issues in an operation S12 the requested digital ticket, respectively, and transmits back a corresponding request response to the portable CE device 100, which response preferably codes the requested digital ticket. The response received by the portable CE device 100 in an operation S13 comprises at least the digital ticket data representing the digital ticket as described above.

The response including at least the digital ticket data may be coded as "smart message" using any message service or data bearer (e.g. email service, SMS, MMS, WAP push message etc.). Preferably, the digital ticket data is stored directly to the protected memory 300 forming there a new data record and data record entry, respectively. This means, a new data record comprising the digital ticket data is appended to the protected memory 300 in an operation S14. The user may be notified to indicate whether the storing operation should be performed or not. Further user-originated interventions should be excluded. Therefore, such a smart message comprising digital ticket data can include pointers and/or instructions to enable the direct storing of the received digital ticket data into the protected memory 300, which is not editable via the user interface of the portable CE device 100. As a supplementary indication of the digital ticket, a basic plain-text message in form of a short message or multimedia message, which corresponds to the received digital ticket data, may be available at the terminal inbox enabling the user to browse existing tickets. The basic plain-text message, stored for example in the inbox directory or particularly in a predefined specific directory, may serve as informational data associated with the data record stored in protected memory 300.

Moreover, the same message, which includes the sensitive data, may contain additionally configuration data applicable with the protected memory 300. The configuration data relates for instance to the predefined configuration data such as the data relating to size of the required memory space, data relating to one time programmable data field configuration, information data relating to a password or person identification number (PIN) protection applicable with the digital ticket data, access control configuration data and other configuration related data. This possibility and presence of configuration data provides for a flexible facility to accept various different data formats at the portable CE device 100 and the protected memory 300, respectively, to ensure future aspects and flexibility in the coding of the data records supported by the means of the protected memory 300.

The security of the sensitive data, i.e. the digital ticket data and related data as aforementioned, is typically based on a hard coded unique identification (UID) or serial number. The unique identification (UID) is applicable as a seed to generate a ticket specific hash key, which is then consecutively used for validating the digital contents as aforementioned. In many cases the given unique identification (UID) is part of the hashed contents. This means, the hashed contents can be used to verify for instance whether the digital ticket is provided by the very same physical electronic ticket, to which it has been previously issued. This prevents cloning of the tickets. Modifications to the ticket contents are not possible without knowledge about the hash key, which should only be available to authorized entities.

In accordance with the inventive concept, the implementation of the data record may have the same structure. The unique identification (UID) or serial number of a data record serves to be protected against modifying, cloning, manipulating, changing, copying and the like. The unique identification (UID) may be implemented at factory to be unique or alternatively for logistics reasons it may be randomly generated. In view of privacy aspects the unique identification (UID) is preferably randomly generated locally at the device every time a new data record is requested. This takes away the potential that the usage pattern of for instance one time valid digital tickets could be correlated back to a given device.

In accordance with the present invention, different techniques are implementable to provide one or more unique identifications (UIDs) or serial numbers for the data records stored in the protected memory 300. According to an approach, a fixed unique identification (UID) is associated with the protected memory 300 and identification device 200, respectively, which provides the data records for being obtained by an external data inquiring entity. For example the fixed unique identification may be obtained on the basis of any unique device identifier such as identifiers included in subscriber identification modules (SIM).

According to another approach of the present invention, the portable CE device 100, the identification device 200 or the protected memory 300 may comprise means for obtaining or generating random unique identifications (UIDs). The fixed and the generated random unique identification (UID) is communicated to the data issuing entity 700 which applies the provided unique identification (UID) for data generation thereon.

Those skilled in the art will appreciate on the basis of the description above that the unique identifications (UIDs) should not be provided by the ticket issuing entity 700 itself. Due to the concept of the unique identification (UID) enlightened above, the unique identification (UID) enables to tie data to be protected against unauthorized manipulations such as modifications, cloning etc. to a defined device, herein for instance the protected memory 300, identification device 200 and/or portable CE device 100, such that the tied data is fixly associated with the corresponding device. To meet the security requirements, ways to set, generate or pre-determine unique identifications (UIDs) should have to be ruled out.

According to a further approach of the present invention, the ticket issuing entity 700 may generate encrypted sensitive data bound to a predefined decryption key. In case the sensitive data is to be provided, a portable CE device 100 may provided by any means with the decryption key just before providing the data record (i.e. and the sensitive data thereof and the ticket data, respectively) via the identification device 200. For example, such a decryption key may be provided by the means of a radio frequency identification (RFID) transponder.

It should be noted that the illustrated approaches could be combined in a suitable manner. As a result, ticket data generated and issued by the ticket issuing entity 700 is bound to a valid unique identification (UID). The bounding of the digital ticket meets the security requirements concerning misuse aspects.

With reference to the "smart message" described above, different protocols are available to code such a message, which has the aforementioned properties and which meets the aforementioned requirements. According to an embodiment of the present invention, the properties and requirements, which have to be followed to gain an appropriate smart message, corresponds substantially to the requirements and properties, which are fulfilled by the personal data interchange in the filed of electronic calendar applications. A widely spread and standardized protocol to code and exchange such calendar information is established by the vCalendar or vCal standard, which specifies formats for coding and communicating calendar entries also called calendar events. The vCalendar standard is promoted by the multivendor development initiative named versit. With reference to the vCalendar standard, those skilled in the art will appreciate that informational data and sensitive data can be coded as a vCalendar object for being communicated between ticket issuing entity 700 and portable CD device 100. More particular, the vCalendar format and coding allows to define user information, purpose of usage and validity information corresponding substantially to the vCalendar properties content, location, start and end time of the object "meeting". Additionally, arbitrary binary data can be included in vCalendar objects such that sensitive data, configuration data and instructions to enable the direct storing of the received sensitive (ticket) data can be included therein. Correspondingly, vCalendar-coding format may be applicable to code information for informing the user adequately and to filter and sort the data records, which will be described in more detail below.

Those skilled in the art will appreciate on the basis of the above description that the illustrated obtaining of data from the data issuing entity 700 represents an embodiment of the present invention. In general, data may be requested by the means of a WEB or WAP page, a ticket teller machine or the like, representing the illustrated data issuing entity 700. The generated data may be communicated to the portable CE device by the means of any communication interface including without limiting thereto wire-based and wireless interfaces.

A second set of operations relates to the user-originated access, which is allowed by the means of the user interface operable with the portable CE and automated maintenance of the data records according to an embodiment of the invention, respectively.

According to the embodiment illustrated with reference to FIG. 3a, the user may be provided with the user interface to browse through the data records and the readable information extracted therefrom and the user is possibly allowed for deleting one or more data records at his will. However, the actual existing data records (data record entries) are not accessible otherwise, i.e. besides reading access only the option of deleting the data records is provided to the user.

In an operation S20, the user initiates a scanning operation relating to the data records.

In an operation S21, the scanning operation requested by the user is preferably operable with the scanning means 400 mentioned above and results in informational data relating to the data records stored in the protected memory 300. In accordance with the security aspects discussed above in detail, the scanning operation and scanning means 400 adapted thereto should be limited to the informational data, which includes information such as user information, purpose of usage, validity information, and further information on the basis of which subsequent filtering and sorting operations are operable.

According to aforementioned embodiments of the invention, the informational data may be included in the data records or may be stored separately from the data records. Accordingly, the scanning operation and the scanning means 400 adapted thereto obtains, retrieves or extracts from the storage place of the informational data. Moreover, the informational data may have to be extracted from the data records, i.e. for instance the digital ticket data. In general, the contents of the extracted information resulting from the scanning operation may differ depending on the purpose of the data record. The scanning operation results in extracted user-readable information retrieved from all currently existing data records.

In an operation S22, the extracted information is filtered to identify data records, which are currently relevant. The currently relevance may be defined in accordance with filter rules and sorting rules applicable to the extracted information obtained by the previous scanning operation S21. The selection is operable with the selector means 410 mentioned above.

A first adequate approach considers the validity information and compares the validity information extracted from each data record with the current time and date, respectively, to obtain adequate filtering and sorting of the data records. In case the validity information matches, the data record is considered as being valid, i.e. relevant, and the relevant data records are sorted in a sequence obtained from the validity information. A second approach considers the information about purpose of usage in conjunction with a location and/or position information relating to the current position information of the portable CE device 100.

With reference to aforementioned digital tickets, only those digital tickets are relevant, which are valid at the current moment in time and/or which purpose of usage corresponds to the current location/position. Digital tickets, which are valid in future, which have been expired, which are redeemed, which do not correspond to the current location/position and the like, are excluded from the selection result obtained by the filtering operation.

In addition or alternatively, further contextual information, which define a current operational context of the portable CE device, are applicable for the aforementioned filtering and sorting of relevant data records out of the plurality of data records being presently stored in the protected memory. Such contextual information is described below with reference to FIG. 6.

Conclusively, a subset of data records is identified as currently relevant, where the relevance is defined by the filter rules provided therefore. The extracted information of the selected data records, i.e. the subset of data records, or at least a part of the extracted information is displayed to the user with the help of the user interface in an operation S23. The user is allowed to browse through the displayed information in order to gain an overview of the relevant/valid data records. Preferably, the extracted information comprises user information, which contents adequately inform about the corresponding data records.

In accordance with an embodiment of the present invention, the operations S21 and S22, i.e. the scanning and selection operations are performed autonomously and automatically. With reference to the protected memory 300 which offers a limited storage capacity, the number of data records being capable to be stored therein is generally limited. The autonomous and automated scanning and selecting operations allow to identify invalid data records, i.e. data records, which are have been expired, which are redeemed, which are de-validated due to any reasons and the like. Invalid data records are not applicable any more and consequently, such invalid data records are deleted autonomously and automatically. Filter rules, which are adapted to identify invalid data records, are correspondingly defined.

Alternatively, the user may wish to be informed about all data records presently stored in the protected memory 300. Accordingly, the section operation relating to the filtering and sorting can be omitted. This means, in an operation S24, the user initiates a scanning operation S25 to obtain informational data relating to the stored data records. In turn, the scanning operation is preferably operable with the scanning means 400 mentioned above. The scanning operation results in obtained informational data retrieved in accordance with the all currently existing data records, which obtained informational data is then displayed in an operation S26 with the help of the user interface to the user. The user is again allowed to browse trough the displayed information.

In addition, the user is allowed to delete one or more data records from the protected memory 300 at his will. In an operation S27, the user may initiate a deleting of a certain data record, which is consequently erased completely from the protected memory 300. The deleting operation is preferably performed with the help of the configurator means 420. The storage space, which has been allocated previously for storing the erased data record is de-allocated and released for storing a new data record such as described with reference to operations S10 to S14. In case the storage place of the informational data and the data record differs, the deleting operation may also concern the informational data.

The deleting operation may be an optional function operable with the user interface provided to the user, which is operable with the displaying of information extracted from the data records as described with reference to operations S21 and S25.

The operations S20 to S23, S24 to S26 and S27 may be repeated as required by the user, respectively. Additionally or alternatively, the scanning and selecting operations illustrated above in detail allow for automated and autonomous maintenance of the protected memory 300. This means, one or more data records, which are redeemed, de-validated and the like such that the data records will not be applicable any more, are automatically removed from the protected memory 300, in order to provide their storage space for string new data records therein. The automated and autonomous maintenance may be repeated regularly or may be triggered by any event such as switching on/off, exceeding of a predefined level relating to the usage of the memory space of the protected memory 300.

The operations described above illustrate user interaction with the data records and in particular browsing through informational data relating to the data records. The user interaction may be operable by the means of a specific user interface provided therefor. Alternatively, currently known user interfaces may be adapted to the requirements of the user interaction described above. With reference to the example ticket application and the vCalendar application enlightened above, an electronic calendar is abatable for informing the user about the data records on the basis of the informational data and to allow the user to browse therethrough. A calendar event is preferably generated on the basis of the information data. This means, a calendar event with a time or period of validity according to the validity information, and a designation corresponding to the user information and/or purpose of usage. Functions of the electronic calendar such as calendar alerts can be additionally configured on the basis of the information provided by the informational data. For instance, the electronic calendar may initiate an alert a certain period of time before the defined time or period of validity. Besides, the electronic calendar may also be provided with location/position information to trigger events.

Figure 4B:
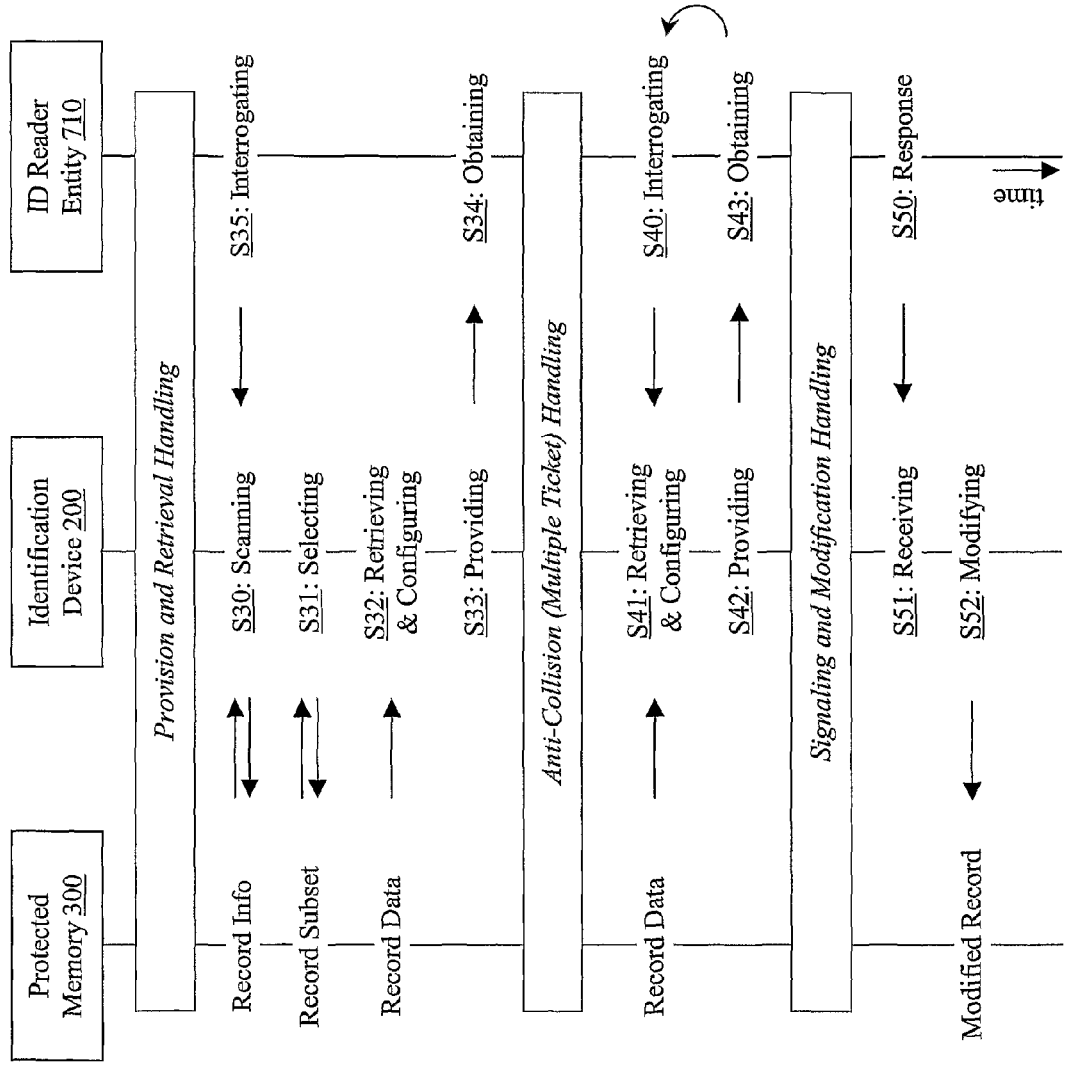
FIG. 4b illustrates schematically a second operational sequence for automated information based selective data provision according to an embodiment of the present invention.

With reference to FIG. 4b, a second operational sequence in accordance with the inventive concept of the present invention shall be described.

A first set of operations relates to the provision and retrieval of a data record embodied as digital ticket according to an embodiment of the invention.

In operations S30 and S31 relevant data records are selected from the plurality of data records stored in the protected memory 300. The operations S30 and S31 correspond to the operations S20 and S21 described in detail with reference to FIG. 3a.

The operation S30 may be initiated by an interrogation signal emitted by corresponding identification reading entity in an operation S35. The interrogation signal activates the identification device 200 and instructs the identification device 200 to provide data for being transmitted to the identification reader entity 710 such as described in detail with reference to FIGS. 1a and 1c. The identification reader entity 710 may be a radio frequency identification (RFID) reader entity.

In an operation S32, the at least one of the selected data records is retrieved form the protected memory 300 and configured at the identification device 200 with the help of the configurator means 420 to be provided by the identification device 200. This means for instance, at least the sensitive data of the data record, which is above designated as the actual data for being provided via the identification device 200, is retrieved from the protected memory 300. With reference to the digital ticket application, the digital ticket data is retrieved from the protected memory 300. The identification device 200 is then configured with the help of the configurator means 420 to provide the retrieved (sensitive) data for being obtainable wirelessly by the corresponding identification reader entity 710 from the identification device 200. With reference to the radio frequency identification devices described with reference to FIGS. 1b and 1c, the transponder memory 220 is configured to provide the (sensitive) data of the data record via the radio frequency interface 235.

In an operation S34, the corresponding identification reading entity 710 such as the corresponding radio frequency identification (RFID) reader entity 710 obtains the data provided by a radio frequency identification (RFID) device.

A second set of operations relates to the multiple data record (digital ticket data) handling according to an embodiment of the invention.

It should be noted that according to the present invention, there might be a plurality of data records that are relevant/valid at the same time. This means that according to the digital ticket embodiment there might be more than one digital tickets available for being provided at a current moment in time. To enable the multiple provision of data records being selected as relevant data records, anti-collision methodology available for radio frequency identification (RFID) technology can be used in an adapted implementation.

The operation allowing for multiple data record provision according to an embodiment of the present invention can be realized as follows. In an operation S40, the corresponding radio frequency identification (RFID) reader entity 710 for instance an automated ticket redemption machine, emits an interrogation signal to the radio frequency identification (RFID) device 200. In response to the interrogation signal, the radio frequency identification (RFID) reader entity 710 receives a first response as illustrated with respect to the operations S33 and S34.

In case the radio frequency identification (RFID) reader entity 710 detects that the response does not correspond with an expected response, i.e. is not familiar, the radio frequency identification (RFID) reader entity 710 discards the obtained data and emits in an operation S40 a further interrogation signal. In an operation S41, data of a next relevant data record is retrieved from the protected memory 300 in response to the further interrogation signal and the retrieved data is configured at the radio frequency identification (RFID) device 200 for being provided therewith. The data provided by the radio frequency identification device 200 is in turn retrieved by the radio frequency identification (RFID) reader entity in an operation S43 and check whether the retrieved data corresponds to expected data. If necessary, the operations S40 to S43 are repeated, in particular until the expected data is finally retrieved.

Alternatively, the multiple data record (digital ticket data) handling according to another embodiment of the invention may be completely operable with the radio frequency identification device 200. This means, in the operation S32 the radio frequency identification (RFID) device 200 is configured with data of all selected data records, which are selected as relevant. Consequently, the radio frequency identification (RFID) device 200 is responsible to provide subsequently data relating to each selected data record for being retrieved by the radio frequency identification (RFID) entity 710 at receiving corresponding interrogation signals.

In detail, anti-collision methodology for instance in accordance with the ISO/IEC 14443 standard for radio frequency identification (RFID) transponder and reader, respectively, is based on a transmission of specific protocol commands in a so-called anti-collision loop. The anti-collision methodology in accordance with the ISO/IEC 14443 is operable with a unique identification (UID), which is preferably part of each data record. Detailed information about the anti-collision methodology can be obtained from the corresponding standard disclosure available from the IEEE organization. In brief, the anti-collision methodology in question is based on a subsequent inquiry of the unique identifications (UIDs) of each responding radio frequency identification (RFID) transponder, within the coverage are if the radio frequency identification (RFID) reader entity supporting the anti-collision methodology. The subsequent inquiry of the unique identifications (UIDs) is based on a partly transmission of the unique identifications (UIDs) in conjunction with a collision detection. Finally, the inquiring radio frequency identification (RFID) reader entity is in knowledge about each unique identification (UID) of the radio frequency identification (RFID) transponder being within its coverage area. Next, the radio frequency identification (RFID) transponders are individually addressable by its unique identification (UID).

The adapted anti-collision methodology allows simulating a plurality of radio frequency identification (RFID) devices being simultaneously active. Each of the simulated radio frequency identification (RFID) devices correspond to one of the selected data record and provides data of the respective data record for being retrieved by the radio frequency identification (RFID) reader entity 710. Therefore, the radio frequency identification (RFID) device 200 simulates a collision during the inquiry of the unique identification (UID) transmitted by the radio frequency identification (RFID) reader entity 710. Subsequently, the radio frequency identification (RFID) device 200 transmits the unique identifications (UIDs) of the selected data records to the radio frequency identification (RFID) reader entity 710 such that the radio frequency identification (RFID) reader entity 710 is capable to selectively retrieve the data of the selected data records by the means of the respective unique identification (UID).

A third set of operations relates to signaling and modification handling according to an embodiment of the invention.

According to another embodiment of the present invention, the radio frequency identification (RFID) entity 710 may also send back one or more dedicated commands. For example a one time programmable field is comprised by the data provided by the radio frequency identification (RFID) device 200, which indicates that the digital ticket data is already used and cannot be used again, as the one time programmable field change is irreversible. For instance a command transmitted by the radio frequency identification (RFID) entity 710 instructs to change one or more values of the one time programmable field.

Moreover, the radio frequency identification (RFID) entity 710 acting as an authorized entity may also send back one or more commands relating to a modification on the data record stored in the protected memory 300. As aforementioned, allowed modification access of an authorized entity may be coded in an access control field or as access control data of the data record. For example, a one time programmable field is deployed as one time counter to enable a carnet type digital ticket such as 10 single trips known for instance for the Paris Metro and the public transportation system of Munich.

In an operation S50, the radio frequency identification (RFID) entity 710 generates and transmits a radio frequency signal carrying one or more corresponding modification commands. In an operation S51, the radio frequency identification (RFID) device 200 receives the radio frequency signal carrying the commands and initiates the modification upon the data of the data record. The corresponding information about the instructed modification or the modified data is supplied to the configurator means 420, which in turn is responsible to update the corresponding data record stored in the protected memory in an operation S52.

The scanning means 400, selector means 410, and configurator means 420 may represent program code sections each including program codes, which, when carried out by a corresponding processing means such as a processor, controller and the like, perform the corresponding operations. It should be understood that the aforementioned means may be implemented either in the portable CE device 100, the identification device 100 or in both the portable CE device 100 and the identification device 100. An application interface layer (API) may be provided to allow applications operable with the portable CE device 100 to use the functionality of the scanning means 400, selector means 410, and configurator means 420. For example filter and/or sorting rules as defined above may be provided to the selector means 410 via the application interface layer (API) in order to control the operation of the selector means 410 such that suitable results can be obtained which correspond to the defined filter and/or sorting rules.

Contextual information, context information or context-related information may be understood as any information, on the basis of which conclusions can be drawn about the actual context, in which the portable CE device 100 is currently operated. This means, the contextual information is suitable for performing the above-described selection operation.

It shall be noted that two ways for determine an adequate context have been illustrated above. The one way to determine an operational context is to check the context, in which the identification device 200 operates, which may comprise a time and/or a position/location information. The other way to determine the context utilized other means for defining context from the environment in accordance with contextual information. The acquisition and processing of contextual information will be described with respect to FIGS. 6a and 6b, which illustrate schematically implementations concerning the portable CE device and implementations relating to external source entities serving the contextual information.

Figure 6A:
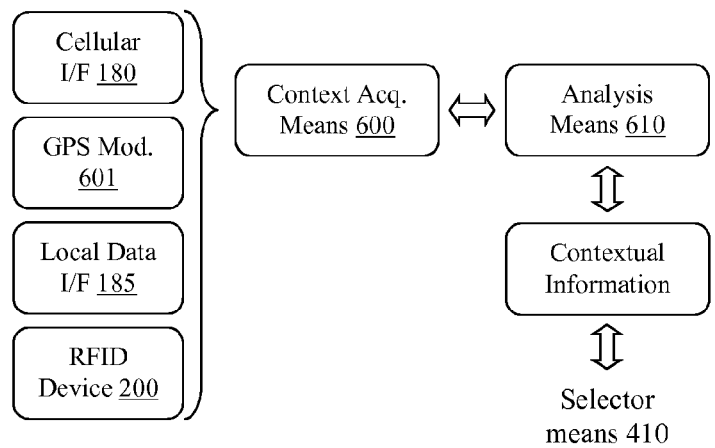
FIG. 6a illustrates schematically a block diagram including functional components implemented in a portable CE device according to an embodiment of the present invention.
Figure 6B:
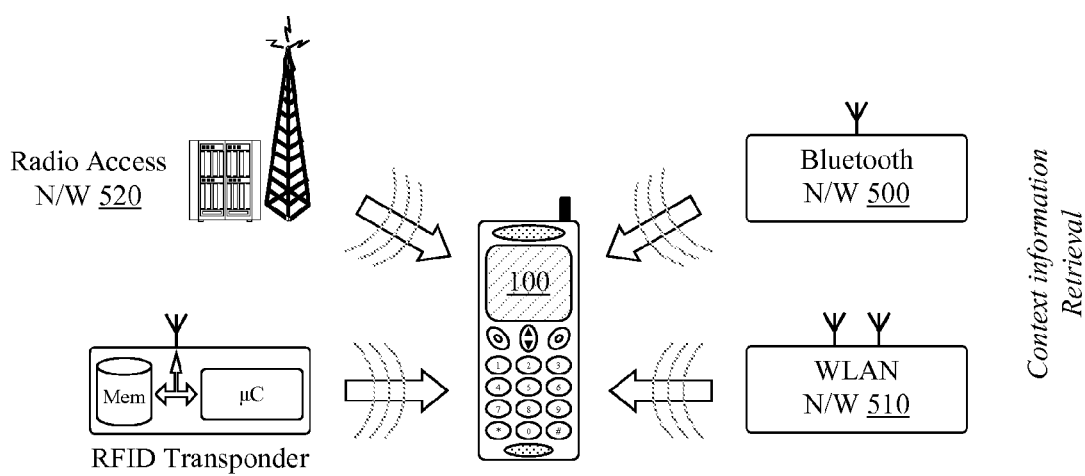
FIG. 6b illustrates schematically external source entities serving contextual information according to an embodiment of the present invention.

With reference to FIGS. 6a and 6b, functional components and units, respectively, which are implemented in the portable CE device, are depicted comprising a context information acquisition means 600, an analysis means 610, and a selection means 620. The context information acquisition means 600 shall represent several distinct means, which allow acquisition of suitable contextual information. In detail, the context information acquisition means 600 may be operable with the cellular interface 180 for cellular communications with a radio access network (N/W) 520, a local data interface 185 for instance a low power radio frequency (LPRF) interface (I/F) such as the Bluetooth transceiver with a Bluetooth network (N/W) 500, a WLAN transceiver with a WLAN network (N/W) 510, an ultra wideband (UWB) transceiver and any other transceiver operable with IEEE 802.xx standards for wireless data communications with a corresponding network. Alternatively, the context information acquisition means 600 may be the radio frequency identification (RFD) device 200 as embodied above or may be a sensor means such as the GPS module 601. It shall be noted that the enumeration of the context information acquisition means 600 presented above is not limiting, a portable CE device 100 operable with the present invention may be coupled internally or externally to one or more of the means illustrated above and/or may be coupled internally or externally to one or more means, which are adapted for obtaining suitable contextual information.

The context information acquisition means 600 is operable to obtain contextual information. In detail, the environment may be scanned (repeatedly) for (externally provided) information being employable as context-related information, on the basis of which (automated) selection operation may be operated. Suitable context-related information comprises several content types of information, which contents relate to different original purposes. Suitable context-related information might comprise at least location information, location-related information, location-based information and dedicated information, respectively.

The scanning operation should be understood as a passive scanning operation and an active scanning operation, respectively. During passive scanning, a context information acquisition means is adapted, configured or provided to obtain the context-related information, the supplying of which is initiated by an external source. That means that the context information acquisition means 600 may be configured to be ready-to-receive context-related information. During active scanning, a context information acquisition means 600 is adapted, configured or provided to actively obtain the context-related information by for instance active transmitting of one or more signals (e.g. interrogation signals), upon which initiates the supplying of the context-related information is operable.

The location information and location-related information primarily code a geographical position or an indication of place of the user using the location service. The location-based information primarily codes information, which are obtained on the basis of a location information. Location information and location-related information may be obtained via a cellular network implementing location service and location-based services, respectively. Alternatively, location information relating to a position information can also be obtained from global positioning system (GPS) signals received by a global positioning system (GPS) module. Such position information allows identifying a certain location/position e.g. a movie theater etc. The dedicated information shall be understood as information, which refer to pre-defined operations and which codes one or more instructions, in accordance with which the operations can be referenced.

The context information obtained by the context information acquisition means 600 is then supplied to the analysis means 610, which is adapted to analyze the obtained contextual information. The analyzing operation depends and is based on the contents of the contextual information, which is obtained before. As aforementioned, the contents of the contextual information can differ significantly such that provisions may have been taken to enable the analyzing operation. Finally, the contextual information resulting from the context information acquisition means and the analyzing means is deployable for the aforementioned filtering and sorting operations, where the contextual information may serve as filter rules and sorting rules.

The means illustrated above including the scanning means 400, the selector means 410, the configurator means 420 and the analyzing means 610 may represent program code sections, each including program codes, which, when carried out by a corresponding processing means such as a processor, controller and the like, perform the corresponding operations. Moreover, the aforementioned means 400, 410, 420 and 610 may represent one or more logic circuits, which are adapted to perform the corresponding operations.

A use case of a context depending filtering operation shall be illustrated finally. It shall be assumed that the user of the portable CE device 100, which is equipped with an identification device 100 and a protected memory 300 storing a specific digital ticket reaches a ticket redemption machine and a ticket inspection spot, respectively, which expects to retrieve the stored specific digital ticket from the identification device 200. The ticket inspection spot should be equipped with a data communication interface, in particular a wireless data communication interface, via which data communication between ticket inspection spot and portable CE device 100 is operable. The ticket inspection spot communicates for instance a command instructing the portable CE device 100 to initiate a ticket search application, which is supplied by the ticket inspection spot with suitable filter rules, which are adequate to identify the expected specific digital ticket. The ticket search application configures and uses the means 400, 410 and 420 provided for scanning, selecting and configuring the expected specific digital ticket at the identification device 200, which matches with filter rules supplied by the ticket inspection spot. Subsequently, the ticket inspection spot is enabled to retrieve the specific digital ticket from the configured identification device 200.

It is obvious for those skilled in the art that as the technology advances, the inventive concept can be implemented in a broad number of ways. The invention and its embodiments are thus not limited to the examples and specific embodiments described above but may vary within the scope of the claims.

The invention claimed is:

1. A method, comprising:
   storing a plurality of data records within a device, wherein each of the plurality of data records includes content retrievable from the device via wireless machine-reading by an external entity, and wherein each of the plurality of data records further includes descriptive information describing the content data;
   associating filter information to each of the plurality of data records by extracting the descriptive information describing the content data of each of the plurality of data records;
   obtaining, by the device, contextual information defining a current operational context of the device to create one or more filter rules, wherein the current operational context is obtained independently of user input to the device and inputs from the external entity;
   selecting, by the device, two or more of the plurality of data records by matching the filter information associated to each of the plurality of data records with the one or more filter rules for identifying two or more currently relevant data records for redemption;
   configuring, by the device, the two or more selected data records to be accessible for machine reading via a radio frequency interface of the device so that at least the content data of the selected data records is retrievable via wireless machine-reading by the external entity;
   receiving an indication from the external entity that a first selected data record does not correspond to an expected response; and
   configuring, in response to the indication, next data record to be retrievable by the external entity through machine-reading.

2. The method according to claim 1, further comprising providing the two or more selected data records to the external entity including presenting the first of the two or more selected data records to the external entity.

3. The method according to claim 1, further comprising:
   simulating a plurality of machine readable devices by the device as being simultaneously active, wherein each of the simulated machine readable devices correspond to the two or more selected data records; and
   providing a requested data record to the external entity through machine-reading in response to a selective retrieval of the requested data record from the two or more selected data records by the external entity.

4. The method according to claim 1, wherein the content of the data records is stored in a protected memory of the device, and wherein user-originated access to at least the content of the plurality of data records is limited by way of access control rules.

5. The method according to claim 4, wherein the user-originated access to at least the content of the data records is limited to read and delete operations by the access control rules.

6. The method according to claim 4, wherein the content utilizes a one time programmable field to indicate that a particular data record is already used and cannot be used again.

7. The method according to claim 4, wherein the descriptive data is stored separately from the content, and wherein access to the descriptive data is not regulated by way of the access control rules.

8. The method according to claim 1, wherein the context information obtained by the device comprises one or more of time, location, and position.

9. The method according to claim 1, further comprising obtaining the context information from an external source entity.

10. A device, comprising:
   at least one processor; and
   at least one memory including computer program code, the at least one memory and the computer program code configured to, with the at least one processor, cause the device at least to:
      store a plurality of data records within the device, wherein each of the plurality of data records includes content retrievable via wireless machine-reading by an external entity, and wherein each of the plurality of data records includes descriptive information describing the content data;
      associate filter information to each of the plurality of data records by extracting the descriptive information describing the content data of each of the plurality of data records;
      obtain contextual information defining a current operational context of the device to create one or more filter rules, wherein the current operational context is obtained independently of user input to the device and inputs from the external entity;
      select two or more of the plurality of data records by matching the filter information associated to each of the plurality of data records with the one or more filter rules for identifying two or more currently relevant data records for redemption;
      configure the two or more selected data records to be accessible for machine reading via a radio frequency interface of the device so that at least the content data of the selected data records is retrievable via wireless machine-reading by the external entity;
      receive an indication from the external entity that a first selected data record does not correspond to an expected response; and
      configure, in response to the indication, next data record to be retrievable by the external entity through machine-reading.

11. The device according to claim 10, wherein the processor further causes the device to:
   provide the two or more selected data records to the external entity including presenting the first of the two or more selected data records to the external entity.

12. The device according to claim 10, wherein the processor further causes the device to:
   simulate a plurality of machine readable devices by the device as being simultaneously active, wherein each of the simulated machine readable devices correspond to the two or more selected data records; and
   provide a requested data record to the external entity through machine-reading in response to a selective retrieval of the requested data record from the two or more selected data records by the external entity.

13. The device according to claim 10, further comprising a protected memory storing at least the content of the data records and limiting user-originated access to at least the content of the plurality of data records by way of access control rules.

14. The device according to claim 13, wherein the user-originated access to at least the content of the data records is limited by way of the access control rules to read and delete operations.

15. The device according to claim 13, wherein the content utilizes a one time programmable field to indicate that a particular data record is already used and cannot be used again.

16. The device according to claim 13, wherein the descriptive data is stored separately from the content, and wherein access to the descriptive data is not regulated by way of the access control rules.

17. The device according to claim 10, wherein the context information obtained by the device comprises one or more of time, location, and position.

18. The device according to claim 10, further comprising obtaining the context information from an external source entity.

19. A computer-readable storage medium encoded with a computer program code for causing a device to at least perform:
   storing a plurality of data records within the device, wherein each of the plurality of data records includes content retrievable from the device via wireless machine-reading by an external entity, and wherein each of the plurality of data records further includes descriptive information describing the content data;
   associating filter information to each of the plurality of data records by extracting the descriptive information describing the content data of each of the plurality of data records;
   obtaining contextual information defining a current operational context of the device to create one or more filter rules, wherein the current operational context is obtained independently of user input to the device and inputs from the external entity;
   selecting two or more of the plurality of data records by matching the filter information associated to each of the plurality of data records with the one or more filter rules for identifying two or more currently relevant data records for redemption;
   configuring the two or more selected data records to be accessible for machine reading via a radio interface of the device so that at least the content data of the selected data records is retrievable via wireless machine-reading by the external entity;
   receiving an indication from the external entity that a first selected data record does not correspond to an expected response; and
   providing, in response to the indication, next data record to be retrievable by the external entity through machine-reading.

20. The computer-readable storage medium according to claim 19, wherein the computer program code further causes the device to perform:

providing the two or more selected data records to the external entity including presenting the first of the two or more selected data records to the external entity.

21. The computer-readable storage medium according to claim 19, wherein the computer program code further causes the device to perform:

simulating a plurality of machine readable devices by the device as being simultaneously active, wherein each of the simulated machine readable devices correspond to the two or more selected data records; and providing a requested data record to the external entity through machine-reading in response to a selective retrieval of the requested data record from the two or more selected data records by the external entity.

22. The computer-readable storage medium according to claim 19, wherein the content of the data records is stored in a protected memory of the device, and wherein user-originated access to at least the content of the plurality of data records is limited by way of access control rules.

23. The computer-readable storage medium according to claim 22, wherein the user-originated access to at least the content of the data records is limited to read and delete operations by the access control rules.

24. The computer-readable storage medium according to claim 22, wherein the content utilizes a one time programmable field to indicate that a particular data record is already used and cannot be used again.

25. The computer-readable storage medium according to claim 22, wherein the descriptive data is stored separately from the content, and wherein access to the descriptive data is not regulated by way of the access control rules.

26. The computer-readable storage medium according to claim 19, wherein the context information obtained by the device comprises one or more of time, location, and position.

27. The computer-readable storage medium according to claim 19, further comprising obtaining the context information from an external source entity.

* * * * *